United States Patent

[11] 3,609,001

[72] Inventor Heinz Paul Weber
 Middletown, N.J.
[21] Appl. No. 42,243
[22] Filed June 1, 1970
[45] Patented Sept. 28, 1971
[73] Assignee Bell Telephone Laboratories, Incorporated
 Murray Hill, Berkeley Heights, N.J.

[54] NONRECIPROCAL OPTICAL DEVICE USING POLARIZED SECOND HARMONIC GENERATED RADIATION
 5 Claims, 1 Drawing Fig.
[52] U.S. Cl.................................................. 350/147,
 307/83.3, 321/69 R, 350/157
[51] Int. Cl.................................................. G02b 5/30
[50] Field of Search.......................................... 350/147,
 150, 151, 157, 160; 307/83.3; 330/4.5; 321/69 R

[56] References Cited
UNITED STATES PATENTS
3,409,819 11/1968 Soffer.......................... 321/69 R Primary Examiner—David Schonberg
Assistant Examiner—Paul R. Miller
Attorneys—R. J. Guenther and Arthur J. Torsiglieri ABSTRACT: There is disclosed a nonreciprocal optical device in which optical wave energy is admitted through a polarizer, generates a second harmonic or orthogonal polarization, and mixes with the second harmonic to generate phase-matched fundamental wave energy of the orthogonal polarization, which is extracted through a crossed polarizer. Nonreciprocity results from the lack of phase-matching in the backward direction.

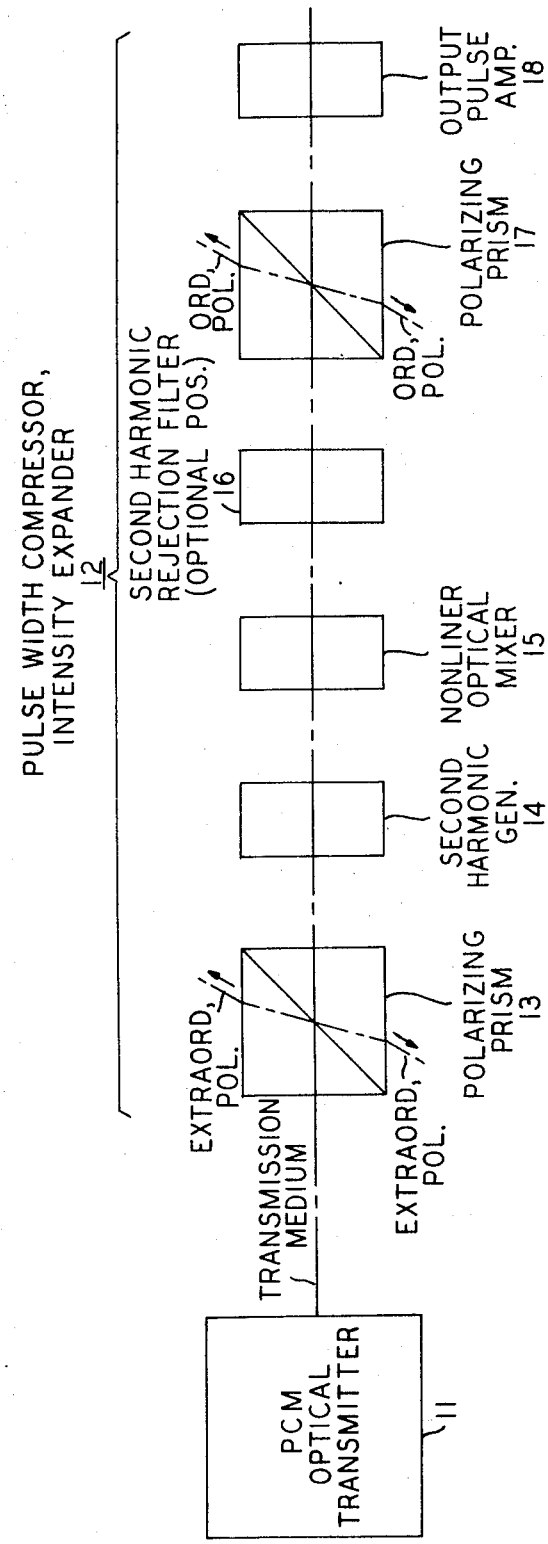

NONRECIPROCAL OPTICAL DEVICE USING POLARIZED SECOND HARMONIC GENERATED RADIATION

BACKGROUND OF THE INVENTION

This invention relates to nonreciprocal optical devices. Such devices are useful in various types of optical communication systems, laboratory instruments and other optical wave transmission apparatuses, such as optical circulators. An optical circulator is a nonreciprocal optical device having three or more parts, such that energy applied at a first port appears at a second port; but energy applied at the second port appears, not at a first port, but at a third port.

Prior nonreciprocal optical devices have typically employed Faraday rotation between crossed polarizers. Polarizers are said to be crossed when they are oriented to pass orthogonal polarizations of light transmitted along an axis therebetween. An example of such a prior nonreciprocal optical device is found in U.S. Pat. No. 3,267,804, issued Aug. 23, 1966. Such prior devices, insofar as they are not undesirably lossy, permit a very limited choice of materials, particularly for operation in the visible region of the spectrum. Those materials are too expensive for many applications.

Nonreciprocal optical devices providing low loss and a wider range of usable materials would be highly useful in the above-described types of systems and apparatuses.

SUMMARY OF THE INVENTION

I have invented a nonreciprocal optical device in which optical wave energy is admitted through a polarizer with a first polarization, generates a second harmonic of orthogonal polarization, and mixes with the second harmonic to generate phase-matched fundamental wave energy of the orthogonal polarization, which is extracted through a crossed polarizer. Nonreciprocity results from the lack of phase-matching for nonlinear generation in the backward direction.

In embodiments in which more than two ports are desired, as in an optical circulator, the crossed polarizers may be crossed polarizing prisms. In embodiments in which only two ports are desired, the crossed polarizers may be any type of crossed polarizers.

Another significant novel aspect of my invention is its capability of discriminating pulses against a noise background. This capability is sometimes referred to as pulse intensity expansion, inasmuch as input light of relatively low intensity appears at the output attenuated proportionately more than input light of a higher intensity.

Still another significant novel aspect of my invention is its property of pulse width compression. That is, each output pulse has a lesser time duration than the input pulse that produced it.

BRIEF DESCRIPTION OF THE DRAWING

A more complete appreciation of my invention may be obtained from the following detailed description, taken together with the drawing in which the sole FIGURE is a partially pictorial and partially block diagrammatic showing of a preferred embodiment of the invention.

DESCRIPTION OF ILLUSTRATIVE EMBODIMENT

In the illustrative embodiment of the drawing, electromagnetic wave energy from a source, illustratively an optical pulse-code-modulation (PCM) transmitter 11, is to be transmitted to an output port, illustratively the output of the optional pulse amplifier 18, without permitting transmission of light in the reverse direction.

Pulse code modulation is a type of modulation in which information is carried by the transmitted wave in the form of the presence or absence of pulses in periodic expected times of occurrence, called time slots. The pulses actually transmitted are typically transmitted with equal amplitudes and pulse widths. Pulse code modulation is the most likely form of modulation for future optical communication systems.

The nonreciprocal optical device 12 is disposed between transmitter 11 and amplifier 18 and includes the crossed polarizers 13 and 17 and, therebetween, the second harmonic generator 14 and the nonlinear optical mixer 15.

Optionally, device 12 includes a second harmonic rejection filter 16 between mixer 15 and polarizer 17; but the filter 16 could be inserted at any point thereafter as a separate component or could be eliminated entirely by selecting a dichroic polarizer 17 that will not pass the second harmonic to the amplifier 18 or by selecting amplifier 18 to have a passband not including the second harmonic.

Prisms 13 and 17 are illustratively polarizing prisms providing separate paths for the respective rejected polarizations of optical electromagnetic wave energy, instead of absorbing it as some usable alternative polarizers would do. The use of polarizing prisms allows the device 12 to operate effectively without overheating even at extremely high power levels. Even more specifically, polarizers 13 and 17 are Glan-Thompson prisms, providing the indicated lateral paths for the indicated polarizations of forward- and backward-propagating light. Nevertheless, the polarizers 13 and 17 could also be any other polarizing prisms oriented as crossed polarizers and could still enable the device 12 to act as a circulator.

The second harmonic generator 14 is illustratively a nonlinear optical crystal, such as potassium dihydrogen phosphate (KDP) crystal oriented for phase-matched generation of second harmonic pulses of extraordinary polarization from the fundamental pulses of ordinary polarization passed by polarizer 13, for the case in which transmitter 11 is illustratively a neodymium laser operating at 1.06 micrometers. The beam propagation direction is in the (110) plane of the crystal of generator 14 and has an angle of 41°31' with respect to the $c$-axis of the crystal. The pumping light polarization is orthogonal to the (110) plane, which contains the $c$-axis. Suitable, but possibly different, orientations are readily determined for every other type of birefringent nonlinear optical crystal, given the specification of phase-matched second-harmonic generation with the second harmonic orthoganally polarized to the fundamental.

The nonlinear optical mixer 15 is illustratively another nonlinear optical crystal, such as a potassium dihydrogen phosphate (KDP) crystal oriented for mixing the fundamental and second harmonic of mutually orthogonal polarizations to generate pulses having fundamental frequency but polarization like that of the second harmonic, i.e., extraordinary. The beam propagation direction is in the (100) plane of the crystal of mixer 15 and has an angle of 59°49' with respect to the $c$-axis of the crystal. The polarization of the residual fundamental light is orthogonal to the (100) plane, which also contains the $c$-axis; and the polarization of the second harmonic light is in the (100) plane of the crystal of mixer 15.

The operation of the illustrative embodiment may be described as follows.

The transmitter 11 transmits a train of pulse-code-modulated optical pulses of frequency $\omega$, which may be subjected to amplitude noise and distortions of polarization as they pass a transmission medium to device 12. The pulses are polarized by polarizer 13 so that the energy passed to second harmonic generator 14 has a polarization that may be designated ordinary. Any component of the input pulse energy having extraordinary polarization will be reflected upward at the interface within the compound prism and out of device 12 at a position that may be termed an additional port of device 12.

The crystal generator 14 generates second harmonic wave energy having frequency $2\omega$ and having (extraordinary) polarization orthogonal to the polarization of the fundamental energy transmitted into generator 14. The unconverted fundamental energy, still with ordinary polarization, is transmitted through generator 14 and is transmitted with the second harmonic energy to mixer 15.

In mixer 15, difference frequency mixing of the previously unconverted fundamental energy and the second harmonic energy occurs. The difference frequency is $\omega$ because of the so-called degenerate condition of operation of the mixer 15.

That is, $2\omega-\omega=\omega$. The generated pulses of difference frequency $\omega$ are distinguishable from the original fundamental pulses because the difference frequency pulses have extraordinary polarization and readily pass through polarizing prism 17 to amplifier 18.

Any residual fundamental energy, which ash ordinary polarization, is reflected from the internal interface of prism 18 and out of device 12 at a position that may be termed still another port of device 12. The residual second harmonic energy has extraordinary polarization but is readily filtered from the difference frequency energy, illustratively by rejection filter 16, either just before or at any point after prism 17. Filter 16 illustratively is a tilted reflector employing multiple dielectric layers or a selective absorber having a narrow rejection band (absorption band) centered around $2\omega$.

Any backward-propagating optical energy incident on polarizing prism 17 is directed downward at the interface within prism 17 and out of device 12 if it has ordinary polarization. If it has extraordinary polarization, it passes backward through components 17, 16, 15, and 14 without significant nonlinear generation because of the lack of phase-matching. And it is then directed out of device 12 in the downward direction at polarizing prism 13. Thus, two more ports of device 12 are apparent. Since all backward-propagating fundamental energy is directed out of device 12 without reaching transmitter 11, device 12 can function as a circulator in the specific form shown.

Nevertheless, operation as a circulator is not required and is unimportant to the broadest aspects of my invention.

It should be noted that the time response of the illustrative embodiment is in the picosecond range ($1 \times 10^{112}$ sec.).

As mentioned above, one of the most useful aspects of my invention is noise suppression in a PCM pulse train by pulse intensity expansion. This result is inherent in the above-described device 12 and can be traced principally to the square-law characteristic for second harmonic generation in generator 14. For a given system application, this characteristic may advantageously be selected to suppress most of the input noise between pulses. Also, the difference frequency generation in mixer 15 complements the square-law characteristic of generator 14 to produce an overall cubic law characteristic for device 12, thereby improving its suppression of noise in the absence of a pulse, as between pulses. This idealized description is modified somewhat in the event of saturation in either generator 14 or mixer 15; but there will still be some noise suppression.

Further, as mentioned above, another useful aspect of my invention is pulse width compression. This occurs in device 12 because the second harmonic generation threshold of generator 14 does not respond to the leading and trailing edges of each fundamental energy pulse. Therefore, each second harmonic pulse starts its rise later than the fundamental pulse and falls more quickly at the trailing edge. The difference generation in mixer 15 does likewise because the difference frequency can be generated only when the second harmonic is present. The optimum combination of pulse-width compression and overall efficiency is obtained in the illustrative embodiment because the harmonic generation characteristic and the mixing characteristic are selected for a representative incident Gaussian pulse shape to produce an output pulse of a width equal to $(3)^{1/2}$ times the width of the input pulse, assuming no saturation in either generator 14 and mixer 15 so that the design may be based on the overall cubic law characteristic.

In the system of the drawing, ammonium dihydrogen phosphate (ADP) crystals can be substituted for the KDP crystals with small changes of angles without changing the laser of transmitter 11.

A wider choice of crystals becomes feasible by making appropriate changes in transmitter 11. For example, if a holmium solid state laser (e.g., with a glass host) is used in transmitter 11, proustite ($Ag_3AsS_3$) crystals could be used in generator 14 and mixer 15. Many other combinations are possible in accordance with the principles of my invention.

I claim:

1. A nonreciprocal optical device comprising first and second polarizing elements having relative orientations for extinction of energy of fixed polarization transmitted therethrough along a selected transmission axis, means disposed between said elements for generating energy of a second harmonic frequency phase-matched to energy of a fundamental frequency transmitted through said first element, and means disposed between said harmonic generating means and said second element for generating energy of said fundamental frequency and of orthogonal polarization in a phase-matched interaction with said fundamental energy and said second harmonic.

2. A device according to claim 1 including means disposed on the axis for eliminating second harmonic energy transmitted from the means for generating energy of the fundamental frequency and orthogonal polarization.

3. A device according to claim 1 in which at least one of the generating means includes a nonlinear optical crystal that is oriented to prevent the phase-matched interaction for energy of the fundamental frequency transmitted backward through the second polarizing element and said one generating means.

4. A device according to claim 1 adapted for transmission of a train of pulse-code-modulated pulses of the fundamental frequency, both of the generating means having generation characteristics selected in combination to suppress most noise between said pulses in said pulse train of pulses.

5. A device according to claim 1 adapted for transmission and pulse-width compression of a train of pulse-code-modulated pulses of the fundamental frequency, both of the generating means having generation characteristics selected in combination to yield pulses of said fundamental frequency and orthogonal polarization, which pulses have a width $(3)^{1/2}$ times the width of the pulses of the original polarization.